2,996,468
PROCESS FOR STABILIZING A RESIN-RUBBER LATEX BY ADDITION OF A METAL OXIDE OR HYDROXIDE
Kenneth W. Powers, Nixon, and Alfred L. Miller, Cranford, N.J., assignors to Esso Research and Engineering Company, a corporation of Delaware
No Drawing. Filed Feb. 2, 1959, Ser. No. 790,375
10 Claims. (Cl. 260—29.3)

The present invention concerns highly stable rubber-containing aqueous systems and the preparation thereof. More particularly it concerns the method of making a highly stable aqueous system containing resin and dispersed synthetic rubber which in the rubber trade is known as "dip."

The most satisfactory way of preparing a latex with synthetic low unsaturation hydrocarbon polymers made at low temperatures, e.g. below 0° C., involves dissolving the rubbery polymer in a suitable inert organic solvent, dispersing the rubber solution or cement in an aqueous solution containing an emulsifier and phosphate stabilizer, and thereafter stripping out the inert organic solvent and, in some instances, a portion of the water. By this method it is possible to prepare latices which are highly resistant to coagulation and low temperature instability. However, it has been noted that while the latex is quite stable, it has the undesirable property of causing the formation of gel when it is admixed with a water-soluble thermosetting resin or the monomers of such a resin when the conditions are such that the monomers will react to form resin in situ. While the time required to gel may vary from 1 or 2 days up to 4 or 5 days depending upon the particular lot of latex, the gelation time is considered to be sufficiently short to make it difficult to work with the rubber-resin mixture in commercial operations. A considerable amount of work has been undertaken to determine the cause of this gelation so that it may be delayed or completely eliminated.

It has now been discovered that phosphate-containing latices of synthetic low unsaturation rubbers can be treated so that when they are combined with thermosetting resins, or the monomers used to prepare such resins, the combination will not gel or become undesirably thick for an extensive period of time. This is achieved by removing a substantial amount of the phosphate from solution in the aqueous system by means of a suitable insolubilizing agent. It was noted that the phosphate stabilizer used to prepare the highly stable latices is also a catalyst or promoter for the co-reaction of the phenol and aldehyde which are the monomers or reactants which combine to form the resin. By insolubilizing the phosphate it is possible to control the molecular growth and cross-linking of the resin and thus regulate the gelation time.

Rubber-resin dips are commonly used to treat various fabrics which may be either synthetic or natural. Treatments of this type have special application to automobile and truck tires. Specifically, the nylon, rayon or cotton fabric is generally immersed in an aqueous solution containing dispersed rubber and water soluble resin, and thereafter the dipped fabric is dried in an oven at an elevated temperature, e.g. 100 to 400° F., before it is placed in the tire in the carcass area. One of the functions of the resin is to promote greater adhesion between the rubber and the fabric. However, as mentioned above, certain phosphate salts, especially orthophosphates, which are useful in the production of stable synthetic rubber latices activate the co-reaction between the aldehyde and phenol reactants and cause them to form a thick gel within a relatively short period of time. By removing the orthophosphate, for instance by mass precipitation, it is possible to produce dips that will not gel for up to 40 days or more. Thus, the nongelling dips of the present invention are highly suitable to fabric treaters who are unable to make fresh dip every few days.

The most common low unsaturation rubbery polymer prepared at low temperatures is butyl rubber. Butyl rubber, a term well known in the rubber art, e.g. chapter 24 in "Synthetic Rubber" edited by G. Whitby, is a rubbery copolymer comprising a major proportion of isoolefin having 4 to 7 carbon atoms and a minor proportion of a multiolefin having 4 to 8 carbon atoms. The most commonly employed isoolefin is isobutylene, although other isoolefins such as 3-methyl-butene-1 and 4-methyl-pentene-1 may be used. Suitable multiolefins, which are generally conjugated diolefins, include isoprene, butadiene-1,3, dimethyl butadiene-1,3, piperylene and the like. Most of the copolymers contain about 90 to 99.5 wt. percent isoolefin and 0.5 to 10 wt. percent diolefin, which in most instances is isoprene. The polymerization is generally carried out at a low temperature, e.g. between −50 and −165° C., in the presence of a Friedel-Crafts catalyst, such as aluminum trichloride, dissolved in a lower alkyl halide, such as methyl chloride, ethyl chloride, etc. Their preparation is fully described in U.S. Patent 2,356,128. Butyl rubbers have a viscosity average molecular weight between about 200,000 and 1,500,000 or more and a Wijs iodine number between about 1 and 50.

The physical and chemical properties of butyl rubber may be modified by introducing a small quantity of halogen into the polymer. The halogenated polymer, which is a low unsaturation rubber having approximately the same molecular weight and unsaturation as butyl rubber, can also be used in the nongelling dips of the present invention. In producing halogenated butyl rubber, unmodified, unvulcanized butyl rubber is carefully halogenated unit it contains about at least 0.5 wt. percent (preferably at least about 1.0 wt. percent) combined halogen, but not more than about "X" wt. percent of combined chlorine or 3.0 "X" wt. percent of combined bromine wherein:

$$X = \frac{M_3 L}{(100-L)M_1 + L(M_2+M_3)} \times 100$$

and $L$ = mole percent of the multiolefin in the polymer
$M_1$ = molecular weight of the isoolefin
$M_2$ = molecular weight of the multiolefin
$M_3$ = atomic weight of the halogen Restated, there should be at least about 0.5 wt. percent of combined halogen in the polymer but not more than about one atom of chlorine or 3 atoms of bromine combined in the polymer per molecule of multiolefin present therein; i.e. per double bond in the polymer.

Suitable halogenating agents which may be employed are gaseous chlorine, liquid bromine, alkali metal hypochlorites, or hypobromites, sulfur chlorides or bromides (particularly oxygenated sulfur chlorides or bromides), pyridinium chloride perchloride, N-bromo-succinimide, iodine monochloride, alpha-chloroacetoacetanilide, tribromophenol bromide, N-chloroacetamide, beta-bromomethyl phthalimide, N,N'-dimethyl-5,5 dichloro- or dibromo-hydantoin, and other common halogenating agents.

The halogenation is generally conducted at above 0° to about +100° C., advantageously at about 0° to 65° C., preferably at about 20° to 50° C. (room temperature being satisfactory), depending upon the particular halogenation agent, for about one minute to several hours. An advantageous pressure range is from about 0.5 to 400 p.s.i.a.; atmospheric pressure being satisfactory. The halogenation conditions are regulated to halogenate the rubbery copolymer to the extent mentioned above.

Latices of butyl rubber or halogenated butyl rubber may be prepared by dissolving about 10–30 wt. percent of the rubber in an inert organic solvent, such as a hydrocarbon having from 5–8 carbon atoms, e.g. hexane, benzene or heptane, and dispersing the resulting rubber solution or cement with an aqueous solution containing (a) about 60–900, preferably 100–600, parts by weight of water per 100 parts by weight of rubber (phr.), (b) a minor amount, about 1–10 phr., of a suitable emulsifier and (c) a minor amount, about 0.25–2 phr., of an inorganic orthophosphate compound. When the rubber and aqueous solutions are thoroughly dispersed and emulsified, the organic solvent is removed from the dispersion, preferably by distilling the solvent off at about 150° to 218° F. The finished latex may be further concentrated by such well known methods as creaming and centrifuging. The total solids in the latex, including the emulsifier and stabilizer, may vary from as little as 20 or 30 wt. percent up to 60 or 70 wt. percent depending mainly upon the extent to which the latex is concentrated in the finishing steps.

The phosphate stabilizer used in the preparation of the butyl-type latices permits the preparation of higher solids latices by preventing the formation of coagulum. For instance where the sodium salt of sulfated nonyl phenoxypolyethoxyethanol is used in combination with sodium dihydrogen orthophosphate, latices containing more than 50 wt. percent, e.g. 55–70 wt. percent solids may be prepared without much difficulty.

Many different emulsifiers may be employed, including any one or more of the numerous nonionic and anionic emulsifying agents available to the manufacturer. Among the nonionic emulsifiers which have been found to be useful are the polyoxyalkenated alkyl phenols or alcohols having the general formula

$$R(OCHR_1CHR_1)_nOH$$

wherein R is an alkyl, aryl or alkaryl group, $R_1$ is an alkyl group or hydrogen and $n$ is an integer of 4 to 8 or 10. The alkene oxide units should comprise at least 40 wt. percent of the total molecular weight of the compound. The compounds may be prepared by condensing an alkyl phenol or alcohol with either ethylene oxide or propylene oxide.

Among the anionic emulsifiers which may be used to prepare the butyl-type latices are sodium lauryl sulfate, alkali metal salts of the sulfates of the polyoxyethylated alkyl phenols and sodium oleyl taurate. A particularly suitable emulsifier is the alkali metal, amine or ammonium salt of sulfated alkyl, aryl or alkaryl polyethoxyethanols. The hydrocarbon or substituted hydrocarbon group, that is to say the alkyl, aryl or alkaryl group, may contain from 8 to 18 carbon atoms. The number of ethylene oxide units may range from 1 to 10 per molecule, preferably from 4 to 6 units. The most suitable emulsifiers in this class are the alkali metal salts of sulfated tridecoxypolyethoxyethanol and the alkali metal salts of sulfated nonyl phenoxypolyethoxyethanol. When about 4 to 6 phr. of the aforementioned emulsifiers is used in combination with about 1 phr. of an alkali metal dihydrogen orthophosphate, a highly stable butyl-type rubber latex is obtained.

The amount of phenol-aldehyde resin used in the butyl-type rubber latices will depend to some extent on the solids content of the latex, the character of the fabric to be treated with the dip and the other factors. It is generally necessary to use only a minor proportion of the resin based upon the amount of rubber in the dip. For instance while the total rubber solids, including the emulsifier and stabilizer, may vary from about 10 wt. percent up to about 50 wt. percent the amount of resin is generally less than about 10 wt. percent of the dip and only exceeds this value when the rubber solids approaches 15 wt. percent or higher. In most dips the amount of resin will be about 0.1 to 5 wt. percent. The resins which have been found to be quite satisfactory in butyl-type rubber dips are those belonging to the class of heat-hardening phenol-aldehyde resins. In preparing the resins, it is preferred to use compounds which, prior to heat-hardening or thermosetting, are water soluble to the extent of at least 5 to 10 wt. percent or more. Among the phenolic compounds which are capable of producing resins of this type are the mono- or especially the polyhydroxy benzenes. Of the polyhydroxy benzenes, the dihydroxy derivatives having hydroxyl groups in meta relationship with each other are preferred. Satisfactory phenolic compounds include phenol, cresol, phloroglucinol, xylenol, trimethylphenol, mono- or dichlorophenol, diamyl or diisopropylphenol, p-tertiary butylphenol, p-phenylphenol, and especially resorcinol and its derivatives, such as orcinol. Formaldehyde or any aldehydic material, such as paraformaldehyde, which will form formaldehyde may be used in combination with the above-mentioned phenolic compounds. Other aldehydes which may satisfactorily be employed include such compounds as acetaldehyde and furfural. The molar ratio of phenolic compound to aldehydic compound should be such that the resin formed has a substantial water solubility prior to being thermoset. In order to produce the resin, a small amount of an alkali metal-containing catalyst or other condensing agent should be used. If sodium hydroxide is the catalyst, it is necessary to use only a small amount, that is to say about 0.02 to 0.5 wt. percent based on the resin reactants. Previous studies indicate that the best adhesions are obtained when the phenol and aldehyde are unreacted when they are admixed with the rubber latex so that the resin is formed in situ. For instance, an aqueous solution containing about 0.7 wt. percent resorcinol and 0.5 wt. percent formaldehyde may be prepared in advance and added to the latex before the catalyst is added to the final mixture. It may require from about 1 to 3 days for the resorcinol and formaldehyde to condense to the desired extent if the dip is maintained at room temperature. The condensation time may be substantially shortened by heating the reactants to an elevated temperature, e.g. 70–75° C. for about 2 or 3 hours. The molar ratio of formaldehyde to resorcinol may be varied from about 1.4 to 10 without adversely effecting the adhesive properties of the dip. The sodium hydroxide which is used to catalyze the condensation of the phenol and the aldehyde may also serve to adjust the pH of the dip to between 7.5 and 9 since it is in this range that the most satisfactory fabric to rubber adhesions are obtained.

The insolubilizing agent may be contacted with the latex at various stages depending upon the desires of the manufacturer. For instance, in one embodiment it may be contacted or admixed with the latex before the rubber dispersion is mixed with the resin or resin-forming reactants. In another embodiment it is contacted with the latex immediately after the latex has been mixed with the aldehyde and phenol. A third but less favorable embodiment involves the addition of the insolubilizing agent to the dip after it has been used or aged for several hours or days. The latter method generally postpones the gelation of the dip for several days but the total time required for the dip to gel is usually substantially less than where the insolubilizing agent is contacted with the phosphate-containing latex in accordance with the first two embodiments.

The purpose of the insolubilizing agent is to destroy the catalyzing properties of the soluble phosphate. For example, it has been noted that the gelation of the dip may be substantially postponed by precipitating the phosphate or converting it into a less soluble form with any one or more of numerous chemical compounds. Among the more effective insolubilizing compounds are the inorganic oxygen-containing compounds, e.g. oxides and hydroxides, of metallic elements of groups IIA, IIB and IVA of the Periodic Chart of the Elements on pages 56–57 of Lange's Handbook of Chemistry, 8th edition. For instance calcium oxide, magnesium oxide, lead oxide, zinc oxide, zinc hydroxide, magnesium hydroxide and other slightly soluble oxides and hydroxides of the metals in the aforementioned groups may be used to convert the phosphate in the dip or latex to a relatively insoluble form which has little or no catalytic effect on the condensation of the phenol and aldehyde. These precipitating agents are preferably added in the form of a solid or an aqueous dispersion. Care should be taken to be certain that no material is used which will form a soluble phosphate complex or a soluble complex with the precipitating metal, such as those obtained when an excess of ammonium hydroxide is used to increase the solubility of the precipitating or insolubilizing agent before it is added to the latex or dip. Where a dispersion or slurry of the insolubilizing agent is prepared in advance, it is advantageous to make the dispersion as concentrated as the properties of the particular compound permit. To postpone the gelation of the dip for the longest possible period, that is to say for one or more months, a sufficient amount of insolubilizing agent should be added to completely or substantially remove the phosphate from solution. At least one equivalent of insolubilizing agent should be added per equivalent of orthophosphate in the latex or dip. In order to insure complete insolubilization of the phosphate, it is generally desirable to use a slight excess of the insolubilizing agent. The agent may be added to the latex or dip by means of a continuous process which provides sufficient means for agitating the two components to allow thorough mixing. In a batch process the insolubilizing agent may be added to the latex or dip while the latter is being agitated with a suitable stirrer rotating at a speed which will not cause excessive foaming. The reaction conditions, namely time, temperature and pressure, will depend upon the particular insolubilizing agent employed. In most instances the reaction will take place within a few minutes, e.g. 1 or 2 seconds up to 10 minutes, after the agent has been added to the latex or dip. The pressure may be atmospheric and the temperature approximately that of the room, e.g. 60–80° F. The process, however is not restricted to the aforementioned time, pressure and temperature, but rather these should be adjusted according to the other conditions effecting the reaction. For instance, the pressure may vary from as little as 0.5 atmosphere up to 10 or more atmospheres and the temperature may range from 35° F. to 200° F.

The dips containing a precipitating agent to prevent gelation may have the following general formula:

| Component | Weight Percent | |
|---|---|---|
| | Broad Range | Preferred Range |
| Latex Solids (Includes rubber, emulsifier and phosphate stabilizer) | 10–50 | 15–35 |
| Phenol and Aldehyde | 1–10 | 2–5 |
| Precipitating Agent | 0.01–10 | 0.05–5 |
| Water | Balance to make 100 wt. percent | |

The rubber-resin dips prepared in accordance with the present invention have outstanding stability with regard to gelation and may be used to treat various fabrics. The invention has particular application to dips which are employed to treat tire cord fabrics composed of nylon, rayon or cotton.

The following examples serve to illustrate the present invention and demonstrate the advantages described above.

EXAMPLE 1

To 27.2 parts by weight of a butyl rubber latex containing 51.8 wt. percent isobutylene-isoprene butyl rubber having a mol percent unsaturation of 1.8 and a viscosity average molecular weight of 470,000, 4.8 wt. percent of sodium nonyl phenoxypolyethoxy sulfate (4–6 ethylene oxide units) and 1.2 wt. percent sodium dihydrogenorthophosphate, was added 1% by weight (based on the butyl rubber) zinc oxide. The zinc oxide was added in the form of a 50 wt. percent aqueous dispersion and the butyl rubber latex and the zinc oxide dispersion were intimately contacted by means of a stirrer for 0.5 minute. After the zinc oxide had been added to the latex, the latex was then admixed with 70 parts by weight of a 5 wt. percent aqueous solution of resorcinol and formaldehyde in which the molar ratio of resorcinol to formaldehyde was 0.5. The pH of the dip was then adjusted to 8.3 with a 10 wt. percent solution of sodium hydroxide and thereafter a sufficient amount of water was added to the dip to make a dip having the following formulation:

| Component: | Parts by weight |
|---|---|
| Rubber solids (includes rubber, emulsifier and phosphate) | 15 |
| Zinc oxide | 0.15 |
| Resorcinol | 2.2 |
| Formaldehyde | 1.3 |
| Water | 81.35 |

A portion of the above dip together with a control dip containing no zinc oxide were permitted to stand at room temperature (ca. 75° F.) and the time required to form a gel was recorded. In the case of the control, the dip gelled after aging 2 days at this temperature. The dip containing the insolubilizing agent (zinc oxide) had not gelled after aging 40 days at the same temperature. The test was terminated at the end of the 40 day period. When this experiment was repeated with various batches of the same orthophosphate-containing latex similar results were obtained.

The two dips described above were used to treat a single end nylon tire cord at room temperature and each treated cord was evaluated for adhesion at room temperature in the "H" test. The treated cords were dried for 5 minutes at 250° F. in an air oven, cooled and imbedded in an unvulcanized isobutylene-isoprene carcass stock of the following recipe:

| Component: | Parts by weight |
|---|---|
| Butyl rubber | 100 |
| Carbon black, MPC | 24 |
| Carbon black, SRF | 16 |
| N,4-dinitroso-N-methyl aniline | 0.45 |
| Hydrocarbon oil plasticizer[1] | 12.5 |
| Resin tackifier[2] | 4 |
| Zinc oxide | 5 |
| Phenyl-β-naphthylamine | 1 |
| Sulfur | 2 |
| Tellurium diethyldithiocarbamate | 1.3 |
| Benzothiazyldisulfide | 1.0 |

[1] A naphthenic oil having an API gravity of 25.8°, an SSU viscosity at 100° F. of 508 and a flashpoint of 445° F.
[2] Amberol ST–137X, an inactive resin made by Rohm & Haas Co. which is believed to be the condensation product of p-octylphenol and formaldehyde.

The imbedded carcass stock which contained butyl rubber having a viscosity average molecular weight of 270,000 and a mol percent unsaturation of about 2.3 was placed in an "H" test mold equivalent to that described by W. J. Lyons et al. in "Rubber Chemistry and Technology," vol. 20, page 268 (1947) to form an "H" test specimen having the dimensions of 1.5" x ⅜" x ⅛". After press curing the imbedded rubber for 25 minutes at 320° F., the specimens were pulled at 20 inches per minute at 75° F. in a Scott tester designed to pull the nylon cord from the matrix. The "H" adhesion in lbs. per end were 10.7 and 11.2, respectively, for the nylon cords treated with the control dip and the zinc oxide-containing dip. These data show that the insolubilizing agent substantially improved the stability of the dip yet had no adverse effect on its adhesive properties. In fact, there is an indication that the adhesion is improved by the addition of insolubilizing agent to the dip.

EXAMPLE 2

Zinc oxide-containing dips prepared in accordnace with Example 1 were adjusted to contain predetermined amounts of rubber solids. All of the dips, which contained 1 phr. of zinc oxide, were used to treat a single end of nylon tire cord according to the procedure described in Example 1. The cords were treated with the dips after they had aged at room temperature for 3 days. Another portion of each dip was aged at room temperature and the time required to gel was recorded. The data are set forth in Table I:

Table I

EFFECT OF RUBBER SOLIDS ON GEL FORMATION AND ADHESION

| Rubber Solids in Dip, Wt. Percent | Time to Gel, Days | "H" Adhesion, Lbs./End |
|---|---|---|
| 15 | 39 | 11.0 |
| 18 | 41 | 11.5 |
| 25 | 42 | 13.5 |
| 30 | >20 | 15.0 |
| 40 | 14 | 14.8 |

The results show that the insolubilizing agent effectively prevents gel formation even in high rubber solids dips (more than 15 wt. percent) which also contain a proportionately higher amount of phosphate. Without an insolubilizing agent, such as zinc oxide, it would be impossible to use dips having rubber solids of 30 or 40 wt. percent since the amount of soluble phosphate in these dips would cause it to gel in a very short time. Thus, by employing insolubilizing agents in accordance with the present invention, it is possible to use high rubber solids dips for extended periods of time.

EXAMPLE 3

A butyl rubber, resorcinol-formaldehyde dip prepared in accordance with Example 1 except that 0.67 wt. percent (based on the butyl rubber) calcium oxide was added in place of the 1 wt. percent of zinc oxide used in that example. The calcium oxide was added as a dry powder and stilled into the dip for about 2 minutes. The dip had not gelled after aging more than a week at room temperature while the control containing no calcium oxide gelled in 4 days at the same temperature. The test was voluntarily terminated after the 1 week aging period.

EXAMPLE 4

Example 1 was repeated, except 2.8 wt. percent (based on the butyl rubber) lead oxide was added with stirring to the dip in the form of a 60 wt. percent dispersion in water in place of the 1 wt. percent of zinc oxide used in the aforementioned example. The dip had not gelled after aging more than a week at room temperature. The test was voluntarily terminated at the end of the 1 week aging period. The control gelled in 4 days.

It is not intended that the present invention be limited to the above examples which have been submitted to demonstrate how the invention may be carried out. For instance the insolubilizing agent may be any compound or material which will precipitate or remove the soluble phosphate from the latex to a sufficient degree to substantially retard gelation of the dip.

What is claimed is:

1. In a process for producing latices of rubbery polymers comprising major proportions of a $C_4$ to $C_7$ monoolefin and minor proportions of a $C_4$ to $C_8$ multiolefin which comprises dispersing said rubbery polymer in an aqueous solution containing a phosphate stabilizer and an emulsifier and mixing said dispersion with a phenol and an aldehyde capable of forming a resin therewith, the improvement which comprises intimately contacting the mixture with an inorganic oxygen-containing compound selected from the group consisting of the oxides and hydroxides of the metallic elements of groups IIA, IIB and IVA of the Deming periodic chart to reduce the soluble phosphate content of the mixture and inhibit the formation of gel.

2. Process according to claim 1 in which the phosphate insolubilizing agent is an inorganic oxygen-containing compound containing a metallic element selected from the group consisting of the oxides and hydroxides of groups IIA, IIB and IVA of the Deming periodic chart.

3. A process according to claim 1 in which the phosphate stabilizer is an orthophosphate salt.

4. A process according to claim 1 in which the phosphate in the phosphate stabilizer is precipitated by adding to the mixture 1 equivalent of an inorganic oxygen-containing compound containing a metallic element selected from the group consisting of the oxides and hydroxides of groups IIA, IIB and IVA of the Deming periodic chart per equivalent of phosphate compound.

5. Process for improving the stability of an aqueous dispersion of a rubbery polymer comprising major proportions of a $C_4$ to $C_7$ monoolefin and minor proportions of a $C_4$ to $C_8$ multiolefin, said dispersion containing an emulsifier and a phosphate stabilizer and admixed with a phenol-aldehyde resin which comprises adding to said mixture at least an equivalent of an inorganic oxygen-containing compound containing a metallic element selected from the group consisting of the oxides and hydroxides of groups IIA, IIB and IVA of the Deming periodic chart per equivalent of said phosphate stabilizer, to precipitate said phosphate stabilizer.

6. Process according to claim 5 in which the polymer contains at least 0.5 wt. percent combined halogen.

7. Process according to claim 5 in which there is from 0.25 to 2 parts by weight of an orthophosphate stabilizer per 100 parts by weight of said polymer.

8. Process according to claim 5 in which the metallic element of the inorganic oxygen-containing compound is zinc.

9. Process according to claim 5 in which the inorganic oxygen-containing compound is added to said mixture in the form of an aqueous dispersion.

10. Process according to claim 5 in which the inorganic oxygen-containing compound is zinc oxide.

No references cited.